United States Patent [19]
Beck et al.

[11] Patent Number: 5,592,360
[45] Date of Patent: Jan. 7, 1997

[54] COMPACT MOTOR CONTROL UNIT

[75] Inventors: Jayne G. Beck, St. Charles; Mark E. Bortner, Batavia; Larry W. Eads, Aurora; Felix M. Galvan, Jr., St. Charles; Daniel R. Mead, Aurora, all of Ill.; David J. Packard, Fishers, Ind.; George C. Pipis, Geneva, Ill.; Stephanie C. Robinson, Sussex, Wis.; Richard A. Brink, St. Charles, Ill.

[73] Assignee: Furnas Electric Company, Batavia, Ill.

[21] Appl. No.: 489,108

[22] Filed: Jun. 9, 1995

[51] Int. Cl.$^6$ .................................. H02B 1/26
[52] U.S. Cl. .................. 361/626; 361/833; 361/835
[58] Field of Search .................. 361/608, 610, 361/614, 622–623, 626, 642–643, 725–727, 823–824, 834–837

[56] References Cited

U.S. PATENT DOCUMENTS

| | | | |
|---|---|---|---|
| 2,173,101 | 9/1939 | Fiedler | 361/608 |
| 3,717,805 | 2/1973 | Gnaedinger et al. | 361/608 |
| 3,790,861 | 2/1974 | Sakats | 361/626 |

*Primary Examiner*—Gregory D. Thompson
*Attorney, Agent, or Firm*—Wood, Phillips, VanSanten, Clark & Mortimer

[57] ABSTRACT

Bulk and accessibility problems in a motor control unit for installation in a motor control center are eliminated in a unit having a housing (10) in the shape of a rectangular solid and provided with a top wall (14), a bottom wall (16) spaced from the top wall (14), a rear wall (12) and a front (20). A plurality of motor control instrumentalities (24), (26), (36) are located within the housing (10) and are mounted to at least one of the walls (12), (14), (16) in close proximity to the rear wall (12). A side wall (22) is located to one side of the top, bottom and rear walls (12), (14), (16). A pivot (78) mounts the side wall (22) for pivotal movement about an axis generally parallel and in proximity to the rear wall (12). A disconnect switch (104) is carried by the side wall (22) to be disposed in the housing (10) in one position of movement of the side wall (22) relative thereto and a partial front wall (80) is provided for the housing and carried by the side wall (22). An actuator (82) for the disconnect switch is mounted on the partial front wall and a linkage (90), (92), (94), (96), is mounted on the side wall (22) and interconnects the actuator (82) and the disconnect switch (104). As a consequence, the side wall (22) may be pivoted away from the one position to increase access to the interior of the housing (10) and the motor control instrumentalities (24), (26), (30) therein.

10 Claims, 3 Drawing Sheets

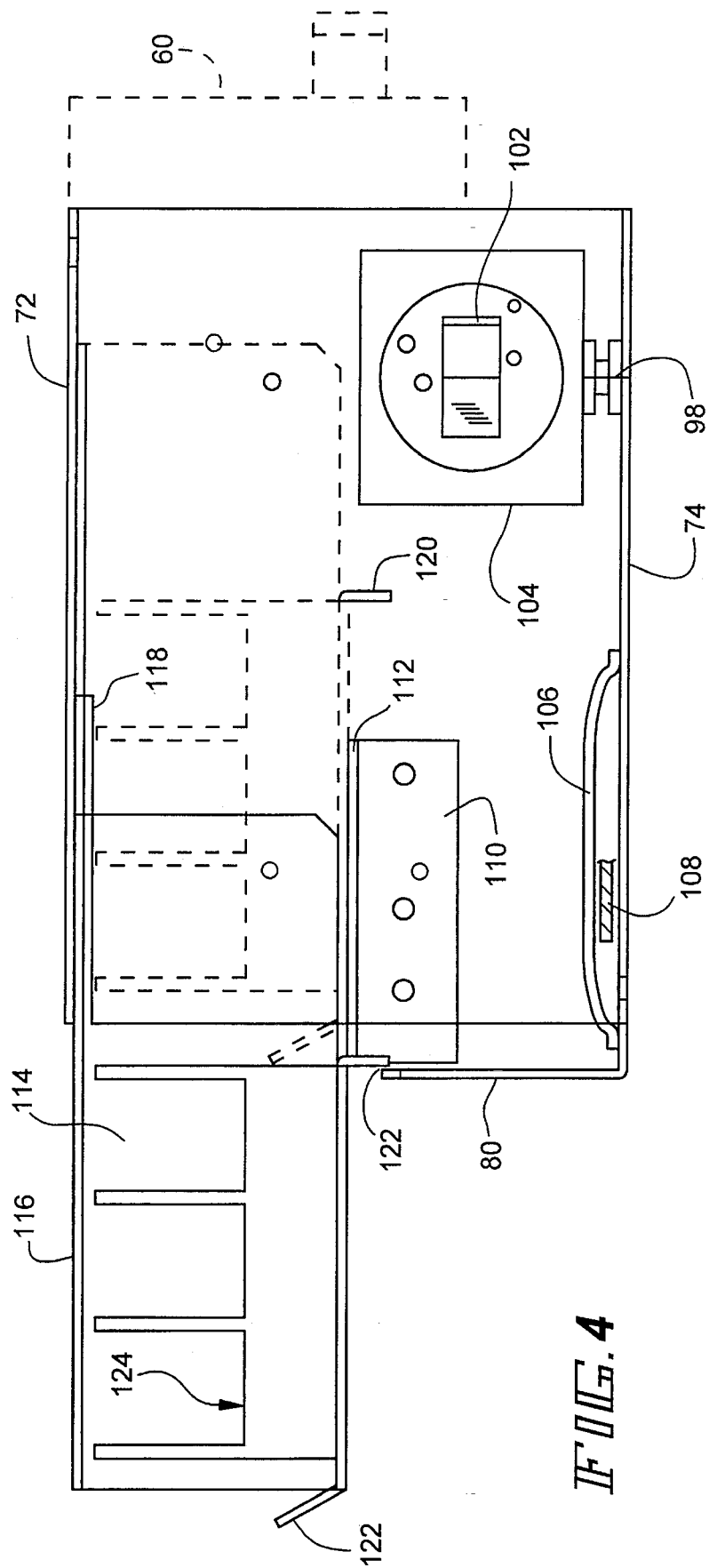

COMPACT MOTOR CONTROL UNIT

FIELD OF THE INVENTION

This invention relates to the control of electric motors, and more specifically, to a compact motor control unit for installation in a motor control center.

BACKGROUND OF THE INVENTION

Electric motors are used extensively in manufacturing operations and it goes without saying that some means is required to control their operation, as well as to provide for protection of the motor and the environment in which the motor is located.

Consequently, it is common to include an overload protector in circuit with the motor which is operative to sense when an overload condition occurs and cut power to the motor. Even with the use of overload relays or the like, it is nonetheless required in many jurisdictions and, is good engineering practice, to include fuses in the motor circuit.

Where the motor draws relatively large amounts of current, it is also conventional to use a so-called "contactor" to connect the motor to power for starting purposes or to disconnect the motor from power to halt the motor's operation. Contactors are basically relays having electromagnetic switches in series with the motor and a source of power. Conventionally, a lower voltage circuit is utilized to provide power to the electromagnet controlling the electrical contacts and thus, a transformer will conventionally be provided to reduce the voltage of the line to that suitable for purposes of control of the contactor. Not infrequently, the various control circuits are fused as well.

The control circuit may take on a variety of forms. Push button or other types of switches may be utilized individually for start, stop, and jog functions for the electric motor being controlled. Various interlocks may be provided to prevent operation of the motor unless several things are occurring simultaneously or certain conditions are not present. Pilot lights may be employed to provide an operator with an indication of the status of the motor and its control circuits. The list goes on forever.

Conventionally, where several motors are involved, a so called motor control center may be employed. A motor control center is typically a panel that includes a plurality of bus bars which are connected to the power line or lines. The panel is constructed so as to be capable of receiving a plurality of motor control units, with a motor control unit for each motor to be controlled.

A typical motor control unit may include a fuse holder for fuses that are placed directly in line with the electric motor, a contactor for stopping and starting the motor, an overload relay for stopping the motor in the event an overload is sensed, a transformer for providing a low voltage for control circuits, a terminal block through which control and power circuits may be connected to the contactor and motor, fuses for the low voltage circuit driven by the transformer, and a disconnect switch which may be opened or closed to connect or disconnect all of the above from the power supplied to the motor control unit by the bus bars.

Packaging all of these components in a small space has been difficult. For one, the components must be sufficiently spaced from one another as well as from the housing constituting the base of the motor control unit so that there will be no arcing to ground should short circuits occur. At the same time, the constructions must be such as to withstand any pressure that might build up during a malfunction if metal, heated by electrical current, vaporizes.

Access to the various components must be relatively easy. For example, fuses in the main motor circuit will blow with some frequency, particularly when the motor is being started, because of the heavy current draw at such times.

It is also necessary to achieve access to all of the various terminals in the unit so that they may be easily initially wired and periodically tightened.

Heretofore, many commercially available types of motor control units have required virtual complete removal from the motor control center for the purpose of changing fuses and/or tightening connections. Where such is not required, frequently the unit is quite large so that easy access can be had to all components within the unit for these purposes. In the case of the former, the added effort that is required to provide maintenance and/or change fuses is costly, and therefore, undesirable. In the case of the latter, more space than is desirable is required to house the motor control center because of the large size of the individual motor control units.

The present invention is directed to overcoming one or more of the above problems.

SUMMARY OF THE INVENTION

It is the principal object of the invention to provide a new and improved motor control unit. More specifically, it is an object of the invention to provide such a unit that avoids the various pitfalls associated with short circuiting and/or arcing while at the same time, provides ready access to the various electrical instrumentalities employed within the unit and is quite compact.

An exemplary embodiment of the invention, according to one facet thereof, achieves the foregoing object in a motor control unit for installation in a motor control center which includes means defining a housing in the shape of a rectangular solid and having a top wall, a bottom wall spaced from the top wall, a rear wall and a front. A plurality of motor control instrumentalities are located within the housing and mounted to at least one of the walls in close proximity to the rear wall. A side wall is located to one side of the top, bottom and rear walls and means mount the side wall for pivotal movement about an axis generally parallel to and in proximity to the rear wall. A disconnect switch is carried by the side wall to be disposed in the housing in one position of movement of the side wall relative thereto. A partial front wall for the housing is carried by the side wall and an actuator for the disconnect switch is mounted on the partial front wall. A linkage is mounted on the side wall and interconnects the actuator and the disconnect switch.

As a consequence, the side wall may be pivoted away from the one position to increase access to the interior of the housing and the motor control instrumentalities mounted therein.

Preferably, there is also included a terminal block within the housing which has a plurality of electrical terminals to which electrical conductors may be connected. Means are provided for mounting the terminal block within the housing and forwardly of the motor control instrumentalities therein for pivotal movement about a pivot axis into and out of the front of the housing and in non-interfering relation with the partial front wall to allow access to the motor control instrumentalities when the terminal block is pivoted out of the housing.

In one embodiment, the housing has a side opposite the side wall and the terminal block pivot axis is closely adjacent to the side as well as the front of the housing.

In one embodiment of the invention, the side wall mounts a drawer for slidable movement into and out of the housing through the front in non-interfering relation with the partial front wall when the side wall is in the one position. A motor control instrumentality is mounted in the drawer for movement therewith.

Preferably, the motor control instrumentality mounted in the drawer is a fuse holder.

The invention contemplates the provision of floating bus bar engaging terminals mounted on the rear wall oppositely of the motor control instrumentalities.

An embodiment of the invention, according to another facet thereof, includes a motor control unit having a housing with a top wall, bottom wall, rear wall and a front as mentioned before together with a side wall and a plurality of motor control instrumentalities within the housing and mounted to at least one of the walls in close proximity to the rear wall. A drawer is mounted on the side wall for sliding movement into and out of the housing through the front and a fuse holder is mounted on the drawer for movement therewith between a first position only within the housing and a second position substantially entirely out of the housing.

In a preferred embodiment, the side wall is pivoted to the rear wall for rotation about an axis parallel to the rear wall and at a location in close proximity to the rear wall.

In a highly preferred embodiment, the rear wall is longer from side to side than the top or bottom wall and includes spaced tabs to which the side wall is pivoted. The side wall further includes an extension of the top wall generally co-planar with the top wall and an extension of the bottom wall which is generally co-planar with the bottom wall. It also includes a partial front panel adapted to partially close the front. The drawer is disposed above or below the partial front panel so as to be movable between the first and second positions in non-interfering relation with the partial front panel.

A disconnect switch may be mounted on the side wall at a location rearwardly of the drawer when the drawer is in the first position. An actuator for the disconnect switch is carried by the partial front panel exterior of the housing and a linkage interconnects the actuator and the switch and is carried by the bottom wall extension.

Other objects and advantages will become apparent from the following specification taken in connection with the accompanying drawings.

DESCRIPTION OF THE DRAWINGS

FIG. 4 is an enlarged, side elevation of a side wall and various components mounted thereon.

DESCRIPTION OF THE PREFERRED EMBODIMENT

Figure 1:
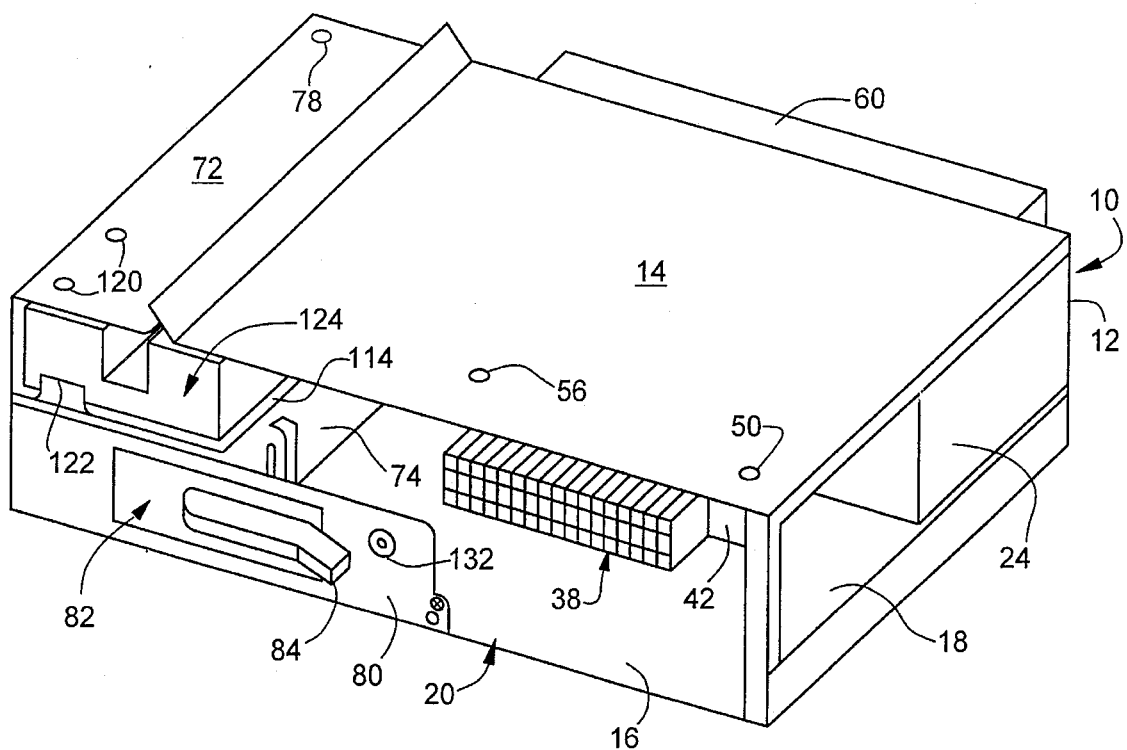
FIG. 1 is a somewhat schematic, perspective view of a motor control unit made according to the invention.

A motor control unit made according to the invention is illustrated in FIG. 1 and is seen to include a housing, generally designated 10, that is in the form of a rectangular solid. The housing 10 has a rear wall 12 (FIG. 3), a top wall 14 and a bottom wall 16 spaced from the top wall 14. It also includes an open side 18, and a generally open front, generally designated 20.

Figure 2:
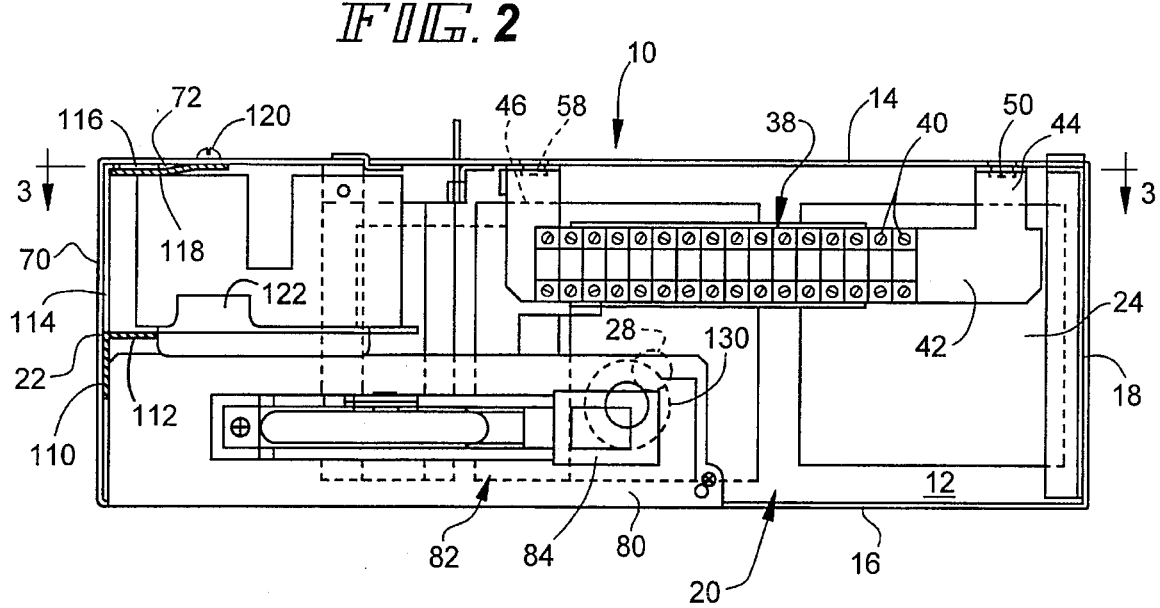
FIG. 2 is a front elevation of the motor control unit.
Figure 3:
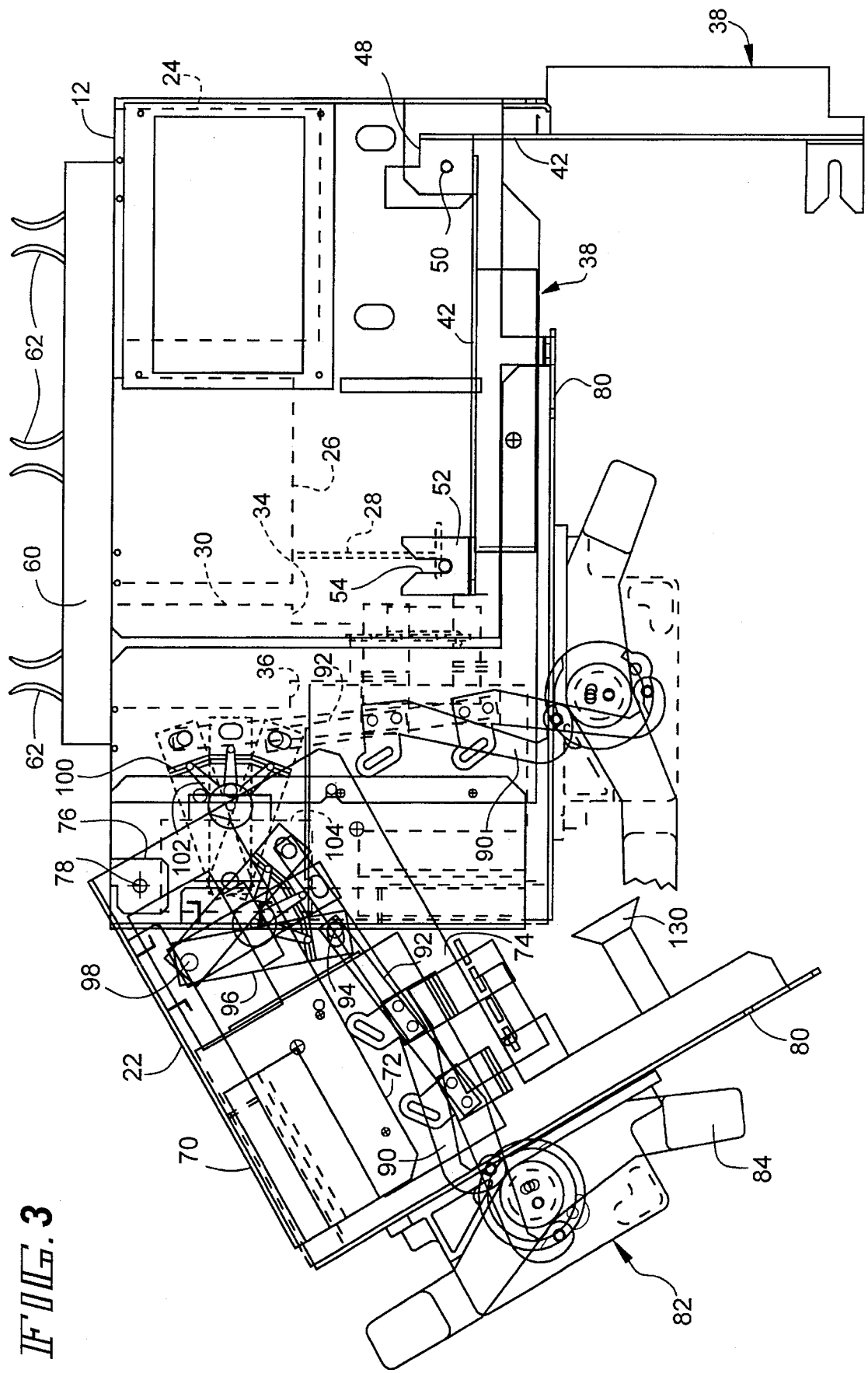
FIG. 3 is a horizontal section taken approximately along the line 3—3 in FIG. 2.

The side opposite the open side 18 is defined by a side wall 22 (FIGS. 2 and 3).

In the usual case, the vertical height of the unit will be 6" or less, which those skilled in the art will appreciate, is quite compact for a motor control unit.

Within the housing 10 are a variety of motor control instrumentalities. As the instrumentalities are conventional, they are only shown in outline form in order to simplify the drawings.

One such instrumentality is a conventional contactor 24. To the side of the compactor 24 is an overload relay 26. The overload relay has a conventional manual reset arm 28 as shown in FIGS. 2 and 3.

Next to the overload relay 26 is a transformer 30 which typically will have fuse holders mounted on it at the locations designated 34 and 36. These locations are on the front side of the transformer 30 and thus will be accessible via the open front 20 of the motor control unit.

It will be seen that each of the contactor 24, the overload relay 26 and the transformer 30 are mounted in close proximity to the rear wall 12. Generally speaking, they will be mounted directed to the rear wall 12 although in some instances, one or more of such components could be mounted to the top wall 14 or the bottom wall 16.

The construction also includes a terminal block, generally designated 38. As best seen in FIG. 2, the terminal block 38 includes a plurality of threaded fasteners 40 which may be clamped against electrical conductors.

The terminal block 38 itself is mounted on an arm 42 which is in the shape of a shallow U having legs 44 and 46. The leg 44 terminates in a horizontally directed tab 48 which extends under the underside of the top wall 14 to receive a pivot pin 50 mounted on the top wall 14 so that the arm 42 may be pivoted between the two positions illustrated in FIG. 3. Thus, the terminal block 38 may be pivoted between positions wholly within the housing 10 and completely outside the same. In the first position, it can be appreciated from FIG. 3 that the same will be in front of the contactor 24 and the overload relay 26. As such, it would limit access to terminals and the like on those components and make it difficult to tighten connections or otherwise perform maintenance operations on them. However, by moving the terminal block 38 to its position outside the housing 10, the entire front faces of both of the instrumentalities 24 and 26 are exposed for access through the front 20 of the housing 10.

Preferably, the leg 46 terminates in a horizontally directed tab 52 which is slotted as at 54. A pin 56 is fastened to the top 14 of the housing 10 and includes an enlarged head 58 (FIG. 2) that will underlie the tab 52 when the arm 42 is disposed within the housing 10, and thus provides support for the arm along with a pivot pin 50, at both ends of the arm 42. The same also serves to limit the degree to which the arm 42 may be pivoted into the housing 10 so as to prevent the same from being pivoted into contact with the overload relay The rear wall 12 supports a subhousing 60. The subhousing 60 in turn mounts three gloating, bus bar connecting terminals 62. The terminals 62 are for connection to the bus bars in the motor control center. Three of the terminals 62 are employed as typically, the motor control unit be employed in a three phase circuit.

The terminals 62 are connected by conductors extending through the rear wall 12 to the interior of the housing 10 in a conventional fashion.

Turning now to the side wall 22 which is best illustrated in FIGS. 2, 3 and 4, the same includes a generally vertically oriented panel 70 which completely closes the corresponding side of the housing 10.

It also includes a top wall extension 72 which is generally co-planar with the top wall 14 and a bottom wall extension 74 which is generally co-planar with the bottom wall 16.

The rear wall 12 is longer than either the top wall 14 or the bottom wall 16 and, at its top and bottom edges adjacent the side wall 22, includes horizontally directed tabs 76 (FIG. 3). The tabs 76 receive respective pivot pins 78 and pivot the side wall 22 for rotation about a generally vertical axis that is parallel to and closely adjacent the rear wall 12.

The side wall 22 also mounts a partial front panel 80 which, as seen in FIG. 2, is disposed to cover what may be termed the approximate lower left hand quadrant of the front 16.

The partial front panel 80 mounts a conventional, lockable actuator assembly, generally designated 82 having an actuating lever 84 movable between the two positions illustrated in FIG. 3. A first link 90 pivoted to the actuator 84 is rigidly connected to a second link 92 which in turn is pivoted by a pin 94 to a third link 96. The link 96 is pivoted by a pin 98 to the bottom wall extension 74 of the side 22 and is movable between the several positions illustrated in FIG. 3. Intermediate its ends, it includes a slotted formation 100 which receives the operator 102 of a conventional disconnect switch 104. The disconnect switch 104 is mounted to the panel 70 of the side wall 22.

As seen in FIG. 4, a bale 106 mounted on the bottom wall extension 74 may be used as a guide for a part 108 of the linkage defined by the links, 90, 92 and 96.

Midway between the top and bottom wall extensions 72, 74, the panel 70 mounts an angle bracket 110 having a horizontal extension 112 into the interior of the housing 10. A generally L shaped sheet metal element 114 is a drawer and is slidably disposed on the upper surface of the extension 112. It also includes a foot 116 that extends toward the interior of the housing 10 and is slidably captured by a flattened, S shaped bracket 118 secured to the top wall extension 72 as by fasteners 120. At its front end, the L shaped drawer includes an upwardly directed tab 121 which may serve as a handle or pull for pulling the L shaped drawer 114 out of the housing 10 over the top of the partial front panel 80 as illustrated in FIG. 4. It may also be used to push the L shaped drawer 114 into the dotted line position illustrated in FIG. 4 which is wholly within the housing 10.

The rear of the L shaped drawer 114 includes a down turned tab 122 which extends below the upper edge 123 of the partial front panel 80. Thus, when the drawer 114 is pulled toward the open position, it cannot be pulled completely out of the unit because of the interference between the tab 122 and the upper edge 123 of the partial front panel 80.

A conventional fuse holder, generally designated 124, capable of holding three fuses, one for each of the three electrical phases with which the motor control unit is employed, is mounted on the drawer 114 for movement therewith. It will be observed that when the drawer 114 is pulled out of the housing to the solid line position illustrated in FIG. 4, the fuse holder 124 is completely out of the housing 10 and totally accessible.

In some cases, the fuse holder 124 and the disconnect switch 104 will be dispensed with in favor of a conventional circuit breaker mounted in the location occupied by the disconnect switch 104. The actuator assembly 82 will then be replaced with an appropriate reset mechanism for the circuit breaker.

Typically, the partial front panel 80 will also mount a conventional reset plunger 130. The plunger 130 is located so as to align with the operator 28 for the reset of the overload relay 26 and include an operator part 132 on the front of the partial front panel 80 as seen in FIG. 1.

From the foregoing, it will be appreciated that a motor control unit made according to the invention achieves the objects previously stated. By locating various instrumentalities within the housing with some in front of the others, vertical compactness is achieved. Similarly, appropriate electrical isolation is possible at the same time.

By making the forward most components movable into or out of the housing, access to those mounted near the rear of the housing is provided to allow for maintenance. The use of the drawer for mounting the fuse holder 124 eliminates difficulties heretofore encountered with the frequent changes of fuses that have blown during motor start up. The mounting of the disconnect switch and actuating linkage therefor along with a fuse handling drawer on a pivotal side wall allows the relatively compact housing to be opened up during initial installation for ease of access to all of the various components.

And where fuse holders (not shown) for the control circuit are mounted on the front of the transformer 30, they are readily accessed for changing when necessary as well. Thus, the invention provides a compact motor control unit that provides for easy access and ready maintenance.

We claim:

1. A motor control unit for installation in a motor control center comprising:

means defining a housing in the shape of a rectangular solid and having a top wall, a bottom wall spaced from the top wall, a rear wall and a front;

a plurality of motor control instrumentalities within said housing and mounted to at least one of said walls in close proximity to said rear wall;

a side wall located at one side of said top, bottom and rear walls;

means mounting said side wall for pivotal movement about an axis generally parallel to and in proximity to said rear wall;

a disconnect switch carried by said side wall to be disposed in said housing in one position of movement of said side wall relative thereto;

a partial front wall for said housing and carried by said side wall;

an actuator for said disconnect switch mounted on said partial front wall; and a linkage at least partially mounted on said side wall and interconnecting said actuator and said switch;

whereby said side wall may be pivoted away from said one position to increase access to the interior of said housing and said motor control instrumentalities mounted therein.

2. The motor control unit of claim 1 further including a terminal block within said housing and having a plurality of electrical terminals to which electrical conductors may be connected; and means mounting said terminal block within said housing and forwardly of said motor control instrumentalities for pivotal movement about a pivot axis into and out the front of said housing and in non-interfering relation with said partial front wall to allow access to said motor control instrumentalities when pivoted out of said housing.

3. The motor control unit of claim 2 wherein said housing has a side opposite said side wall and said terminal block pivot axis is closely adjacent to said side and the front of said housing.

4. The motor control unit of claim 1 wherein said side wall mounts a drawer for slidable movement into and out of said housing through said front in non-interfering relation with said partial front wall and when said side wall is in said one position; and a motor control instrumentality mounted in said drawer for movement therewith.

5. The motor control unit of claim 1 wherein the motor control instrumentality in said drawer is a fuse holder.

6. The motor control unit of claim 1 further including floating bus bar engaging terminals mounted on said rear wall oppositely of said motor control instrumentalities.

7. A motor control unit for mounting in a motor control center, comprising:

means defining a housing in the shape of a rectangular solid and having a top wall, a bottom wall spaced from the top wall, a rear wall and a front;

a plurality of motor control instrumentalities within said housing and mounted to at least one of said walls in close proximity to said rear wall;

a side wall located at one side of said top, bottom and rear walls;

a drawer mounted on said side wall for sliding movement into and out of said housing through said front; and a fuse holder mounted on said drawer for movement therewith between a first position wholly within said housing and a second position substantially entirely out of said housing.

8. The motor control unit of claim 7 wherein said side wall is pivoted to said rear wall for rotation about an axis parallel to said rear wall and at a location in close proximity to said rear wall.

9. The motor control unit of claim 8 wherein said rear wall is longer from side to side than said top or bottom wall and includes spaced tabs to which said side wall is pivoted, said side wall further including an extension of said top wall generally co-planar with said top wall, an extension of said bottom wall and generally co-planar with said bottom wall and a partial front panel adapted to partially close said front; said drawer being offset from said partial front panel so as to be movable between said first and second positions in non-interfering relation with said partial front panel.

10. The motor control unit of claim 9 further including a disconnect switch mounted on said side wall at a location rearwardly of said drawer when said drawer is in said first position; an actuator for said disconnect switch carried by said partial front panel exteriorly of said housing, and a linkage interconnecting said actuator and said switch and at least partially carried by said bottom wall extension.

* * * * *